United States Patent [19]

Hsu et al.

[11] Patent Number: 5,616,653
[45] Date of Patent: Apr. 1, 1997

[54] COUPLED STYRENE-ISOPRENE-BUTADIENE RUBBER

[75] Inventors: Wen-Liang Hsu, Copley; Adel F. Halasa, Bath; Barry A. Matrana, Akron; Scott M. Christian, Clinton; Laurie E. Austin, Hartville; Bill B. Gross, Stow, all of Ohio

[73] Assignee: The Goodyear Tire & Rubber Company, Akron, Ohio

[21] Appl. No.: 681,568

[22] Filed: Jul. 29, 1996

Related U.S. Application Data

[60] Continuation of Ser. No. 439,750, May 12, 1995, Pat. No. 5,541,264, which is a division of Ser. No. 288,858, Aug. 11, 1994, Pat. No. 5,422,403.

[51] Int. Cl.$^6$ ........................................ C08F 8/42
[52] U.S. Cl. .................... 525/332.5; 525/332.8; 525/342; 525/371
[58] Field of Search ...................... 525/332.5, 332.8

[56] References Cited

U.S. PATENT DOCUMENTS

| | | | |
|---|---|---|---|
| 4,843,120 | 6/1989 | Halasa et al. | 525/53 |
| 5,047,483 | 9/1991 | Halasa et al. | 525/237 |
| 5,137,998 | 8/1992 | Hsu et al. | 526/174 |
| 5,262,213 | 11/1993 | Rodgers et al. | 525/99 |
| 5,272,220 | 12/1993 | Rodgers et al. | 525/332 |
| 5,312,849 | 5/1994 | Akits et al. | 525/332 |
| 5,317,062 | 5/1994 | Rodgers et al. | 525/237 |

*Primary Examiner*—Bernard Lipman
*Attorney, Agent, or Firm*—Alvin T. Rockhill

[57] ABSTRACT

The subject invention discloses a process for preparing a coupled styrene-isoprene-butadiene rubber which is particularly valuable for use in making automobile tire tread rubber compounds which comprises the steps of (1) solution terpolymerizing in an organic solvent from about 5 weight percent to about 40 weight percent styrene, from about 1 weight percent to about 10 weight percent isoprene, and from about 50 weight percent to about 94 weight percent 1,3-butadiene, based on total monomers, to a conversion of at least about 90% to produce a living styrene-isoprene-butadiene polymer, wherein the terpolymerization is initiated with an organolithium compound, and wherein the terpolymerization is conducted in the presence of a polar modifier at a molar ratio of the polar modifier to the organolithium compound, which is within the range of about 0.5:1 to about 5:1, and wherein the terpolymerization is conducted at a temperature which is within the range of about 20° C. to about 150° C.; and (2) coupling the living styrene-isoprene-butadiene polymer with a coupling agent selected from the group consisting of tin tetrachloride and silicon tetrachloride, wherein the molar ratio of the coupling agent to the organolithium compound is within the range of about 1:3 to 1:6.

13 Claims, No Drawings

COUPLED STYRENE-ISOPRENE-BUTADIENE RUBBER

This is continuation of application Ser. No. 08/439,750, filed on May 12, 1995, now U.S. Pat. No. 5,541,264, which is a divisional of application Ser. No. 08/288,858, filed on Aug. 11, 1994, now issued as U.S. Pat. No. 5,422,403.

BACKGROUND OF THE INVENTION

Environmental concerns and fuel expenses are of major importance to motorists in the world today and will probably be of growing concern as we move toward the twenty-first century. In recent years, many modifications have been implemented which make motor vehicles more energy efficient. For instance, better fuel efficiency is being attained by implementing more aerodynamic designs which offer a lower coefficient of drag. Improved engine and transmission designs have also improved the overall fuel efficiency of automobiles and trucks. Improved fuel efficiency can also be attained by designing tires which display less rolling resistance. Accordingly, automobile owners are now demanding tires which exhibit low rolling resistance to attain the fuel economy which they are seeking.

In order to reduce the rolling resistance of a tire, rubbers having a high rebound can be utilized in making the tires' treads. Tires made with such rubbers undergo less energy loss during rolling. The traditional problem associated with this approach is that the tire's wet traction and wet skid resistance characteristics are compromised. This is because good rolling resistance which favors low energy loss and good traction characteristics which favor high energy loss are viscoelastically inconsistent properties. Good traction and wet skid resistance are, of course, extremely important characteristics for tires to exhibit and compromising these attributes is generally unacceptable.

In order to balance these two viscoelastically inconsistent properties, mixtures of various types of synthetic and natural rubber are normally utilized in tire treads. For instance, various mixtures of styrene-butadiene rubber and polybutadiene rubber are commonly used as a rubbery material for automobile tire treads. However, such blends are not totally satisfactory for all purposes. Numerous approaches have been taken to balance these viscoelastically inconsistent properties with mixed results being attained.

U.S. Pat. No. 4,843,120 discloses that tires having improved performance characteristics can be prepared by utilizing rubbery polymers having multiple glass transition temperatures as the tread rubber. These rubbery polymers having multiple glass transition temperatures exhibit a first glass transition temperature which is within the range of about −110° C. to −20° C. and exhibit a second glass transition temperature which is within the range of about −50° C. to 0° C. According to U.S. Pat. No. 4,843,120, these polymers are made by polymerizing at least one conjugated diolefin monomer in a first reaction zone at a temperature and under conditions sufficient to produce a first polymeric segment having a glass transition temperature which is between −110° C. and −20° C. and subsequently continuing said polymerization in a second reaction zone at a temperature and under conditions sufficient to produce a second polymeric segment having a glass transition temperature which is between −20° C. and 20° C. Such polymerizations are normally catalyzed with an organolithium catalyst and are normally carried out in an inert organic solvent.

U.S. Pat. No. 5,137,998 discloses a process for preparing a rubbery terpolymer of styrene, isoprene and butadiene, having multiple glass transition temperatures and having an excellent combination of properties for use in making tire treads which comprises: terpolymerizing styrene, isoprene and 1,3-butadiene in an organic solvent at a temperature of no more than about 40° C. in the presence of (a) at least one member selected from the group consisting of tripiperidino phosphine oxide and alkali metal alkoxides and (b) an organolithium compound.

U.S. Pat. No. 5,047,483 discloses a pneumatic tire having an outer circumferential tread where said tread is a sulfur cured rubber composition comprised of, based on 100 parts by weight rubber (phr), (A) about 10 to about 90 parts by weight of a styrene, isoprene, butadiene terpolymer rubber (SIBR), and (B) about 70 to about 30 weight percent of at least one of cis 1,4-polyisoprene rubber and cis 1,4-polybutadiene rubber wherein said SIBR rubber is comprised of (1) about 10 to about 35 weight percent bound styrene, (2) about 30 to about 50 weight percent bound isoprene and (3) about 30 to about 40 weight percent bound butadiene and is characterized by having a single glass transition temperature (Tg) which is in the range of about −10° C. to about −40° C. and, further the said bound butadiene structure contains about 30 to about 40 percent 1,2-vinyl units, the said bound isoprene structure contains about 10 to about 30 percent 3,4-units, and the sum of the percent 1,2-vinyl units of the bound butadiene and the percent 3,4-units of the bound isoprene is in the range of about 40 to about 70 percent.

U.S. Pat. No. 5,272,220 and U.S. Pat. No. 5,317,062 disclose a process for preparing a styrene-isoprene-butadiene rubber which is particularly valuable for use in making truck tire treads which comprises the steps of (1) continuously solution terpolymerizing in an organic solvent from about 5 weight percent to about 20 weight percent styrene, from about 7 weight percent to about 35 weight percent isoprene, and from about 55 weight percent to about 88 weight percent 1,3-butadiene, based on total monomers, to a conversion which is in the range of about 60% to 100% to produce a living intermediate polymer, wherein the terpolymerization is initiated with an organolithium compound, wherein the terpolymerization is conducted in the presence of 10 ppm to 500 ppm of 1,2-butadiene, and wherein the terpolymerization is conducted in the presence of N,N,N', N'-tetramethylethylenediamine at a molar ratio of N,N,N', N'-tetramethylethylenediamine to the organolithium compound which is within the range of about 0.01:1 to about 0.2:1, and wherein the terpolymerization is conducted at a temperature which is within the range of about 75° C. to about 150° C.; (2) partially coupling the living intermediate polymer with a coupling agent selected from the group consisting of divinyl benzene, tin tetrachloride and silicon tetrachloride, wherein the molar ratio of the organolithium compound to the coupling agent is within the range of about 6:1 to about 20:1; (3) allowing the terpolymerization to continue so as to produce the styrene-isoprene-butadiene rubber; and recovering the styrene-isoprene-butadiene rubber from the organic solvent.

U.S. Pat. No. 5,272,220 and U.S. Pat. No. 5,317,062 further disclose a pneumatic truck tire having an outer circumferential tread wherein said tread is a sulfur cured rubber composition comprised of, based on 100 parts by weight of rubber, (a) from about 45 to about 75 parts of a styrene-isoprene-butadiene rubber comprised of repeat units which are derived from about 5 weight percent to about 20 weight percent styrene, from about 7 weight percent to about 35 weight percent isoprene, and from about 55 weight percent to about 88 weight percent 1,3-butadiene, wherein the repeat units derived from styrene, isoprene, and 1,3- butadiene are in essentially random order, wherein from about 25% to about 40% of the repeat units derived from the 1,3-butadiene are of the cis-microstructure, wherein from about 40% to about 60% of the repeat units derived from the 1,3-butadiene are of the trans-microstructure, wherein from about 5% to about 25% of the repeat units derived from the 1,3-butadiene are of the vinyl-microstructure, wherein from about 75% to about 90% of the repeat units derived from the isoprene are of the 1,4-microstructure, wherein from about 10% to about 25% of the repeat units derived from the isoprene are of the 3,4-microstructure, wherein the rubber has a glass transition temperature which is within the range of about −90° C. to about −70° C., wherein the rubber has a number average molecular weight which is within the range of 150,000 to 400,000, wherein the rubber has a weight average molecular weight of 300,000 to 800,000, and wherein the rubber has an inhomogeneity which is within the range of 0.5 to 1.5; and (b) from about 25 to about 55 parts of natural rubber.

Coupled polymers are frequently utilized in tire tread rubber compounds. This is because coupled polymers provide improved processability, lower hysteresis and improved filler-polymer interactions as compared to their uncoupled counterparts. It is well known that the efficiency of coupling agents decreases substantially if the polymer live ends are styryl lithium anions.

Styryl lithium anions are normally at the living chain ends of styrene-butadiene rubbers which are synthesized by anionic polymerizations in the presence of polar modifiers. To overcome this problem, it is known that a small amount of additional 1,3-butadiene monomer can be added to cap the living styryl anion prior to coupling. However, the addition of more 1,3-butadiene monomer after the initial polymerization has been completed but prior to coupling has certain disadvantages. For instance, the introduction of additional 1,3-butadiene monomer into the polymerization medium can increase the level of impurities present in the system. The introduction of additional 1,3-butadiene monomer also represents an additional processing step which, of course, on a commercial basis adds to the ultimate cost of the polymer.

SUMMARY OF THE INVENTION

By utilizing the techniques of this invention, tire tread rubber formulations can be prepared which exhibit outstanding wet traction, wet skid resistance, treadwear and rolling resistance characteristics. Because the styrene-isoprene-butadiene rubbers of this invention exhibit excellent interaction with carbon black and silicon fillers, they are also capable of being processed very easily. In other words, they are easily processable into tire tread rubber compounds.

This invention is based upon the unexpected finding that styrene-isoprene-butadiene rubbers which are terminated with isoprene repeat units can be synthesized employing lithium initiators and polar modifiers without the necessity of a separate isoprene monomer addition step. By employing the techniques of this invention, essentially all of the living chain ends in the polymer are terminated with isoprene repeat units. This is true even in the case of batch techniques where all of the monomers are charged into the polymerization medium before initiating the polymerization. Because virtually all of the living chain ends in the polymer are terminated with isoprene, it can be readily coupled with tin tetrachloride or silicon tetrachloride coupling agents.

After being coupled, the styrene-isoprene-butadiene terpolymer (SIBR) has a high level of affinity for carbon black and silicon fillers. Tin tetrachloride is the preferred coupling agent in cases where the use of silicon fillers is contemplated and silicon tetrachloride is preferred in cases where it is anticipated that carbon black will be employed as the filler. This is because better interaction between the SIBR of this invention and silicon fillers is realized in cases where the SIBR is coupled with tin tetrachloride. On the other hand, better interaction between the SIBR of this invention and carbon black fillers is realized in cases where the SIBR is coupled with silicon tetrachloride.

It has been unexpectedly found that the rolling resistance and tread wear characteristics of automobile tires can be significantly improved by incorporating the styrene-isoprene-butadiene rubber (SIBR) of this invention into the treads thereof. More importantly, this improvement in rolling resistance and tread wear characteristics can be achieved without sacrificing wet traction and wet skid resistance.

The SIBR of this invention is prepared by solution polymerizations utilizing an organolithium initiator. The process used in synthesizing this SIBR is conducted as a batch or continuous process which is carried out at a temperature which is within the range of about 20° C. to about 150° C. In cases where the polymerization is conducted employing a continuous process, it will be necessary to utilize a multiple reactor system to ensure that the polymerization has been carried out to a conversion where isoprene repeat units are at the end of virtually all of the polymer chains. It has been found that gel build-up can be inhibited by conducting such polymerizations in the presence of 1,2-butadiene and N,N,N',N'-tetramethylethylenediamine.

This invention more specifically reveals a process for preparing a coupled styrene-isoprene-butadiene rubber which is particularly valuable for use in making automobile tire tread rubber compounds which comprises the steps of (1) solution terpolymerizing in an organic solvent from about 5 weight percent to about 40 weight percent styrene, from about 1 weight percent to about 10 weight percent isoprene, and from about 50 weight percent to about 94 weight percent 1,3-butadiene, based on total monomers, to a conversion of at least about 90% to produce a living styrene-isoprene-butadiene polymer, wherein the terpolymerization is initiated with an organolithium compound, and wherein the terpolymerization is conducted in the presence of a polar modifier at a molar ratio of the polar modifier to the organolithium compound which is within the range of about 0.5:1 to about 5:1, and wherein the terpolymerization is conducted at a temperature which is within the range of about 20° C. to about 150° C.; and (2) coupling the living styrene-isoprene-butadiene polymer with a coupling agent selected from the group consisting of tin tetrachloride and silicon tetrachloride, wherein the molar ratio of the coupling agent to the organolithium compound is within the range of about 1:3 to 1:6.

The subject invention further discloses a styrene-isoprene-butadiene rubber which is particularly valuable for use in making tire treads, said rubber being comprised of repeat units which are derived from about 5 weight percent to about 40 weight percent styrene, from about 1 weight percent to about 10 weight percent isoprene, and from about 50 weight percent to about 94 weight percent 1,3-butadiene, wherein the repeat units derived from styrene, isoprene, and 1,3-butadiene are in essentially random order, wherein the rubber has a glass transition temperature which is within the range of about −20° C. to about −45° C., and wherein over 90% of the repeat units in the SIBR which are derived from styrene are in blocks of containing less than three repeat units, wherein the rubber is coupled with a member selected from the group consisting of tin tetrachloride and silicon tetrachloride, and wherein the rubber has a number average molecular weight which is within the range of about 250,000 to about 400,000.

This invention also reveals a sulfur curable rubber composition which is particularly useful for making tire treads, said rubber composition being comprised of (a) a styrene-isoprene-butadiene rubber which is particularly valuable for use in making tire treads, said rubber being comprised of repeat units which are derived from about 5 weight percent to about 40 weight percent styrene, from about 1 weight percent to about 10 weight percent isoprene, and from about 50 weight percent to about 94 weight percent 1,3-butadiene, wherein the repeat units derived from styrene, isoprene, and 1,3-butadiene are in essentially random order, wherein the rubber has a glass transition temperature which is within the range of about −20° C. to about −45° C., and wherein over 90% of the repeat units in the SIBR which are derived from styrene are in blocks of containing less than three repeat units, wherein the rubber is coupled with a member selected from the group consisting of tin tetrachloride and silicon tetrachloride, and wherein the rubber has a number average molecular weight which is within the range of about 250,000 to about 400,000; (b) sulfur, (c) carbon black, (d) a silica filler, (e) an accelerator, and (f) at least one additional sulfur curable rubber.

DETAILED DESCRIPTION OF THE INVENTION

The SIBR of this invention is synthesized by solution polymerization. Such solution polymerizations will normally be carried out in a hydrocarbon solvent which can be one or more aromatic, paraffinic or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene, and the like, alone or in admixture.

In the solution polymerizations of this invention, there will normally be from about 5 to about 35 weight percent monomers in the polymerization medium. Such polymerization media are, of course, comprised of the organic solvent, 1,3-butadiene monomer, styrene monomer and isoprene monomer. In most cases, it will be preferred for the polymerization medium to contain from 10 to 30 weight percent monomers. It is generally more preferred for the polymerization medium to contain 20 to 25 weight percent monomer.

The monomer charge compositions utilized in the polymerizations of this invention will typically contain from about 5 weight percent to about 40 weight percent styrene, from about 1 weight percent to about 10 weight percent isoprene and from about 50 weight percent to about 94 weight percent 1,3-butadiene monomer. It is typically preferred for the monomer charge composition to contain from about 20 weight percent to about 35 weight percent styrene, from about 2 weight percent to about 6 weight percent isoprene, and from about 59 weight percent to about 78 weight percent 1,3-butadiene. It is generally more preferred for the monomer charge composition to include from about 25 weight percent to about 30 weight percent styrene, from about 3 weight percent to about 5 weight percent isoprene, and from about 65 weight percent to about 72 weight percent 1,3-butadiene.

The SIBR of this invention can be synthesized on a batch or continuous basis. In batch processes, all of the monomers are generally charged into a single reactor with the polymerization therein being started by the addition of an organolithium initiator. In such batch processes, the polymerization is allowed to continue in the reactor until a high conversion of at least about 98 percent is attained. It is preferred for the monomer conversion to be at least 99 percent and more preferred for the monomer conversion to be in excess of 99.5 percent.

In continuous processes, the monomers and an organolithium initiator are continuously fed into the first reactor of a multiple reaction vessel system. In such multiple reaction vessel systems, it is important for the monomer conversion in the last reactor to attain a high conversion of at least about 98 percent. It is preferred for the monomer conversion to be at least 99 percent and more preferred for the monomer conversion to be in excess of 99.5 percent.

In both batch and continuous polymerizations, the pressure in the reaction vessel is typically sufficient to maintain a substantially liquid phase under the conditions of the polymerization reaction. The reaction medium will generally be maintained at a temperature which is within the range of about 20° C. to about 150° C. throughout the terpolymerization. This is generally preferred for the terpolymerization to be conducted at a temperature which is within the range of about 60° C. to about 120° C. It is typically more preferred for the terpolymerization to be conducted at a temperature which is within the range of about 80° C. to about 100° C.

The organolithium compounds which can be utilized as initiators in the terpolymerization of this invention include organomonolithium compounds and organomonofunctional lithium compounds. The organo multifunctional lithium compounds will typically be organodilithium compounds or organotrilithium compounds. Some representative examples of suitable multifunctional organolithium compounds include 1,4-dilithiobutane, 1,10-dilithiodecane, 1,20-dilithioeicosane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

The organolithium compounds which can be utilized are normally organomonolithium compounds. The organolithium compounds which are preferred can be represented by the formula: R-Li, wherein R represents a hydrocarbyl radical containing from 1 to about 20 carbon atoms. Generally, such monofunctional organolithium compounds will contain from 1 to about 10 carbon atoms. Some representative examples of organolithium compounds which can be employed include methyllithium, ethyllithium, isopropyllithium, n-butyllithium, sec-butyllithium, n-octyllithium, tertoctyllithium, n-decyllithium, phenyllithium, 1-napthyllithium, 4-butylphenyllithium, p-tolyllithium, 1-naphthyllithium, 4-butylphenyllithium, p-tolyllithium, 4-phenylbutyllithium, cyclohexyllithium, 4-butylcyclohexyllithium, and 4-cyclohexylbutyllithium.

The amount of organolithium initiator employed will be dependent upon the molecular weight which is desired for the SIBR being synthesized. An amount of organolithium initiator will be selected to result in the production of SIBR having a number average molecular weight which is within the range of about 50,000 to about 200,000. The amount of organolithium initiator will preferably be selected to result in the production of a SIBR having a number average molecular weight which is within the range of about 75,000 to 150,000. The amount of organolithium initiator will more preferably be selected to result in the production of a SIBR having a number average molecular weight which is within the range of about 85,000 to 120,000. The number average molecular weights reported in this paragraph are before coupling.

As a general rule in all anionic polymerizations, the molecular weight of the polymer produced is inversely proportional to the amount of catalyst utilized. As a general rule, from about 0.01 to about 1 phm (parts per hundred parts of monomer by weight) of the organolithium compound will be employed. In most cases, it will be preferred to utilize from about 0.015 to about 0.1 phm of the organolithium compound with it being most preferred to utilize from about 0.025 phm to 0.07 phm of the organolithium compound.

To inhibit gelation, it is important to carry out such polymerizations in the presence of 1,2-butadiene and N,N,N',N'-tetramethylethylenediamine (TMEDA). For this reason, 1,2-butadiene and TMEDA will also be continuously fed into the reaction vessel utilized. The 1,2-butadiene will typically be present in the polymerization medium at a concentration which is within the range of 10 to about 500 ppm (parts per million parts). It is generally preferred for the 1,2-butadiene to be present at a level which is within the range of about 50 ppm to about 300 ppm. It is generally more preferred for the 1,2-butadiene to be present at a level which is within the range of about 100 ppm to about 200 ppm.

The TMEDA acts as a polymerization modifier and increases the glass transition temperature of the SIBR produced. It will accordingly be employed, either alone or in conjunction with other polar modifiers, in an amount which will result in the SIBR being synthesized having the desired high glass transition temperature. However, to be effective as a gel inhibitor, the TMEDA will typically be present at a molar ratio of TMEDA to the organolithium compound of at least about 0.01:1. It will normally be preferred for a molar ratio of TMEDA to the organolithium compound of at least about 0.1:1 to be employed. It will normally be more preferred for a molar ratio of TMEDA to the organolithium compound of at least about 0.2:1 to be employed.

The glass transition temperature of the SIBR being synthesized will be controlled to be within the range of about −18° C. to about −48° C. This generally requires a molar ratio of the polar modifier to the organolithium which is within the range of about 0.5:1 to about 5:1. More typically, the molar ratio of the polar modifier to the organolithium will be within the range of about 1:1 to about 4:1 to attain the desired glass transition temperature. A very high glass transition temperature is preferred because it provides tire tread compounds with good traction characteristics. However, if polymers having glass transition temperatures higher than about −20° C. are synthesized, the level of polar modifier required will be so high that it will unduly interfere with coupling. In any case, the SIBR terpolymer will typically have a glass transition temperature which is within the range of about −25° C. to about −40° C. and will more preferably have a glass transition temperature which is within the range of about −30° C. to about −35° C.

After the desired high monomer conversion of at least about 98% is achieved, the living polymer is coupled with tin tetrachloride or silicon tetrachloride. This is typically done in a second reaction vessel. For instance, in the case of a continuous polymerization, the living intermediate polymer can be pumped from the final polymerization reaction vessel to a vessel where the coupling agent is added to the polymerization medium. The coupling agent is added after a monomer conversion of at least about 98% has been attained and is more preferably added after a monomer conversion of 99% has been attained.

The coupling agent is added at a level which is sufficient to jump the molecular weight of the polymer to the desired degree. A high level of coupling of the SIBR terpolymer chains is very desirable. As a general rule, the molar ratio of coupling agent to the organolithium compound will be within the range of about 1:3 to about 1:6. Molar ratios of the coupling agent to the organolithium compound which are within the range of about 2:7 to about 1:5 are preferred because they induce the highest level of coupling to achieve the desired increased in molecular weight.

The coupling increases the Mooney viscosity of the SIBR to be within the range of about 70 to about 120. This high Mooney viscosity provides tires which are manufactured utilizing tire tread compounds containing the SIBR to have outstanding rolling resistance and treadwear characteristics. To achieve these highly desirable objectives, it is beneficial for the Mooney viscosity of the SIBR to be as high as possible. However, the possibility of the rubber becomes more difficult as its Mooney viscosity increases. Accordingly, the Mooney viscosity of the rubber will typically not be in excess of about 120. On the other hand, to get the low rolling resistance and outstanding tread wear, it is important for the Mooney viscosity of the SIBR to be at least 70 and preferably higher. The SIBR of this invention will more typically have a Mooney viscosity which is within the range of about 80 to about 115 and will preferably have a Mooney viscosity which is within the range of 90 to 110.

After being coupled, the SIBR produced is recovered from the organic solvent. The SIBR can be recovered from the organic solvent by standard techniques, such as decantation, filtration, centrification and the like. It is often desirable to precipitate the SIBR from the organic solvent by the addition of lower alcohols containing from 1 to about 4 carbon atoms to the polymer solution. Suitable lower alcohols for precipitation of the SIBR from the polymer cement include methanol, ethanol, isopropyl alcohol, n-propyl alcohol and t-butyl alcohol. The utilization of lower alcohols to precipitate the SIBR from the polymer cement also "kills" the living SIBR chains by inactivating lithium end groups. After the SIBR is recovered from the organic solvent, steam stripping can be employed to reduce the level of volatile organic compounds in the rubber.

The SIBR made by the process of this invention is characterized by being comprised of repeat units which are derived from about 5 weight percent to about 40 weight percent styrene, from about 1 weight percent to about 10 weight percent isoprene, and from about 50 weight percent to about 94 weight percent 1,3-butadiene, wherein the repeat units derived from styrene, isoprene, and 1,3-butadiene are in essentially random order, wherein the rubber has a glass transition temperature which is within the range of about −20° C. to about −45° C., and wherein over 90% of the repeat units in the SIBR which are derived from styrene are in blocks of containing less than three repeat units. The repeat units in the SIBR will preferably be derived from about 20 weight percent to about 35 weight percent styrene, from about 2 weight percent to about 6 weight percent isoprene, and from about 59 weight percent to about 78 weight percent 1,3-butadiene. The repeat units in the SIBR will most preferably be comprised of repeat units which are derived from about 25 weight percent to about 30 weight percent styrene, from about 3 weight percent to about 5 weight percent isoprene, and from about 65 weight percent to about 72 weight percent 1,3-butadiene. These repeat units which are derived from isoprene, styrene or 1,3-butadiene differ from the monomer from which they were derived in that a double bond was consumed by the polymerization reaction.

The repeat units derived from styrene, isoprene and 1,3-butadiene are in the SIBR in an essentially random order. However, the SIBR is not truly random in that the polymer chains are virtually always terminated with isoprene repeat units. The term "random" as used herein means that the repeat units which are derived from styrene are well dispersed throughout the polymer and are mixed in with repeat units which are derived from isoprene and 1,3-butadiene. It has been determined that over 70% of the styrene in the SIBR is present in blocks of only one styrene repeat unit. Over 90% of the repeat units in the SIBR which are derived from styrene are in blocks of one or two repeat units. Over 95% of the styrene in the SIBR is present in blocks of three or less repeat units. Over 97% of the styrene present in the SIBR is present in blocks of four or less repeat units. Over 99% of the styrene present in the SIBR is present in blocks of five or less repeat units. Virtually 100% of the styrene present in the SIBR is in blocks of six or less repeat units. As has been previously indicated, virtually all of the SIBR polymer chains are terminated with isoprene repeat units, by this it is meant that over 98% of the SIBR chains are terminated with isoprene repeat units. Preferably, over 99% of the SIBR polymer chains are terminated with isoprene repeat units.

Preferably, from about 10% to about 20% of the repeat units derived from the 1,3-butadiene are of the cis-microstructure. Preferably, from about 15% to about 30% of the repeat units derived from the 1,3-butadiene are of the trans-microstructure. Preferably, from about 55% to about 70% of the repeat units derived from the 1,3-butadiene are of the vinyl-microstructure. Preferably, from about 15% to about 30% of the repeat units derived from the isoprene are of the 1,4-microstructure. Preferably, from about 70% to about 85% of the repeat units derived from the isoprene are of the 3,4-microstructure.

After coupling, the SIBR will preferably have a number average molecular weight which is within the range of about 250,000 to about 400,000. It is preferred for the SIBR to have a weight average molecular weight which is within the range of about 500,000 to about 600,000. It is preferred for the SIBR to have an inhomogeneity (u) which is within the range of about 0.8 to 1.2. Inhomogeneity is defined by the equation:

$$u = \frac{\text{weight average molecular weight}}{\text{number average molecular weight}} - 1$$

In other words, the ratio of the weight average molecular weight of the SIBR to its number average molecular weight is preferably 2:1.

For purposes of this patent application, polymer microstructures are determined by nuclear magnetic resonance spectrometry (NMR). Glass transition temperatures are determined by differential scanning calorimetry at a heating rate of 10° C. per minute and molecular weights are determined by gel permeation chromatography (GPC).

There are valuable benefits associated with utilizing the SIBR terpolymers of this invention in making tire tread compounds. Such tire tread compounds are blends of the coupled SIBR with one or more additional sulfur curable elastomers. For instance, the SIBR can be blended with natural rubbers and, optionally, high cis 1,4-polybutadiene in making tire tread compounds. One such tread compound is comprised of, based on 100 parts by weight of rubber, (a) from about 45 parts to about 75 parts of the SIBR and (b) from about 25 parts to about 55 parts of natural rubber. It is preferred for this tread compound to contain from about 55 parts to about 65 parts of the SIBR and from about 35 parts to about 45 parts of natural rubber.

Another highly preferred blend for utilization in making automobile tires is comprised of, based on 100 parts by weight of rubber, (a) 50 parts to 70 parts of the SIBR, (b) from about 15 parts to about 45 parts of polyisoprene rubber and (c) from about 2 parts to about 20 parts of high cis 1,4-polybutadiene. It is preferred for this rubber blend to contain from about 55 parts to about 65 parts of the SIBR, from about 5 parts to about 15 parts of the high cis 1,4-polybutadiene, and from about 25 parts to about 40 parts of polyisoprene rubber.

Another highly preferred blend for utilization in making automobile tires is comprised of, based on 100 parts by weight of rubber, (a) 50 parts to 70 parts of the SIBR and (b) from about 30 parts to about 50 parts of high cis 1,4-polybutadiene. It is preferred for this rubber blend to contain from about 55 parts to about 65 parts of the SIBR and from about 5 parts to about 15 parts of the high cis 1,4-polybutadiene rubber.

The high cis 1,4-polybutadiene utilized in such blends typically has a microstructure wherein at least 80% of the butadiene repeat units are cis 1,4-isomeric units. In most cases, the high cis 1,4-polybutadiene will contain at least about 90% cis 1,4-isomeric butadiene units. The high cis 1,4-polybutadiene can be prepared by solution polymerization utilizing a catalyst consisting of (1) an organoaluminum compound, (2) an organonickel compound and (3) a hydrogen fluoride complex as described in U.S. Pat. No. 3,856,764.

For instance, the SIBR rubber can be blended with natural rubber to make tread compounds for passenger tires which exhibit outstanding rolling resistance, traction and tread wear characteristics. Such blends will normally contain from about 5 to about 40 weight percent natural rubber and from about 60 to about 95% of the segmented elastomer. High performance tires which exhibit very exceptional traction characteristics, but somewhat comprised tread wear, can be prepared by blending the SIBR elastomer with solution or emulsion styrene-butadiene rubber (SBR). In cases where tread wear is of greater importance than traction, high cis-1,4-polybutadiene can be substituted for the SBR. In any case, the segmented rubbers of this invention can be used to improve the traction, tread wear and rolling resistance of tires made therewith.

These SIBR containing blends can be compounded utilizing conventional ingredients and standard techniques. For instance, the SIBR containing blends will typically be blended with carbon black and/or silica fillers, sulfur, accelerators, oils, waxes, scorch inhibiting agents and processing aids. In most cases, the SIBR containing rubber blends will be compounded with sulfur and/or a sulfur containing compound, at least one filler, at least one accelerator, at least one antidegradant, at least one processing oil, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur containing compound with 1 phr to 2.5 phr being preferred.

It may be desirable to utilize insoluble sulfur in cases where bloom is a problem.

Normally from 10 to 150 phr of at least one filler will be utilized in the blend with 30 to 80 phr being preferred. In most cases, at least some carbon black will be utilized in the filler. The filler can, of course, be comprised totally of carbon black. Silica can be included in the filler to improve tear resistance and heat build-up. Clays and/or talc can be included in the filler to reduce cost.

The commonly employed siliceous pigments used in rubber compounding applications can be used as the silica in this invention, including pyrogenic and precipitated siliceous pigments (silica), although precipitate silicas are preferred. The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc. The PPG Hi-Sil silicas are currently preferred.

The blend will also normally include from 0.1 to 2.5 phr of at least one accelerator with 0.2 to 1.5 phr being preferred. Antidegradants, such as antioxidants and antiozonants, will generally be included in the blend in amounts ranging from 0.25 to 10 phr with amounts in the range of 1 to 5 phr being preferred. Processing oils will generally be included in the blend in amounts ranging from 2 to 100 phr with amounts ranging from 5 to 50 phr being preferred. The SIBR containing blends of this invention will also normally contain from 0.5 to 10 phr of zinc oxide with 1 to 5 phr being preferred. These blends can optionally contain from 0 to 10 phr of tackifier resins, 0 to 10 phr of reinforcing resins, 1 to 10 phr of fatty acids, 0 to 2.5 phr of peptizers, and 0 to 1 phr of scorch inhibiting agents.

The SIBR containing rubber blends of this invention can be used in tire treads in conjunction with ordinary tire manufacturing techniques. Tires are built utilizing standard procedures with the SIBR simply being substituted for the rubber compounds typically used as the tread rubber. After the tire has been built with the SIBR containing blend, it can be vulcanized using a normal tire cure cycle. Tires made in accordance with this invention can be cured over a wide temperature range. However, it is generally preferred for the tires of this invention to be cured at a temperature ranging from about 132° C. (270° F.) to about 166° C. (330° F.). It is more typical for the tires of this invention to be cured at a temperature ranging from about 143° C. (290° F.) to about 154° C. (310° F.). It is generally preferred for the cure cycle used to vulcanize the tires of this invention to have a duration of about 10 to about 14 minutes with a cure cycle of about 12 minutes being most preferred.

This invention is illustrated by the following examples which are merely for the purpose of illustration and are not to be regarded as limiting the scope of the invention or the manner in which it can be practiced. Unless specifically indicated otherwise, all parts and percentages are given by weight.

EXAMPLE 1

In this experiment, 2,300 grams of a silica/alumina/molecular sieve/NaOH dried premix containing 19.2 weight percent styrene/isoprene/butadiene in hexane was charged into a one gallon (3.8 liters) reactor. The ratio of styrene to isoprene and to 1,3-butadiene was 30/5/65. After the scavenger level of 2 ppm was determined, 0.79 ml of neat TMEDA (N,N,N',N'-tetramethylethylenediamine; 6.63M) and 3.59 ml of a 1.04M solution n-butyl lithium (in hexane; 3.47 ml for initiation and 0.24 ml for scavenging the premix) was added to the reactor. The molar ratio of modifier to n-butyl lithium was 1.5. The polymerization was allowed to proceed at 70° C. for 1.5 hours. Analysis of the residual monomers contained in the polymerization mixture by gas chromatograph indicated that the polymerization was 99.8% complete at this time. The polymerization was continued for another 30 minutes to assure 100% conversion. A small portion of the reaction mixture (300 grams; the base polymer) was then removed from the reactor and stabilized with an ethanol/antioxidant mixture. The remainder of the reaction mixture was then coupled using a coupling agent, SnCl4 (tin tetrachloride), at a 0.25/1 ratio to n-butyl lithium. Thus, 0.75 ml of a 1M solution of SnCl4 solution (in hexane) was added to the reactor and the coupling reaction was proceeded at 70° C. for 30 minutes. Then, 1 ml of ethanol was added to the reactor to shortstop the polymerization and polymer was removed from the reactor and stabilized with 1 phm of antioxidant. After evaporating hexane, both base and coupled polymers were dried in a vacuum oven at 50° C. The coupled 30/5/65 SIBR was determined to have a glass transition temperature (Tg) at −22° C. and have a microstructure which contained 38% 1,2-polybutadiene units, 27% 1,4-polybutadiene units, 3% 3,4-polyisoprene units, 2% 1,4-polyisoprene units and 30% random polystyrene units. The Mooney viscosities of the base and coupled 30/5/65 SIBRs were 18 and 72, respectively.

COMPARATIVE EXAMPLE 2

The procedure described in Example 1 was utilized in this example except that a 30/70 mixture of styrene/1,3-butadiene was used as the premix. The coupled 30/70 SBR was determined to have a Tg at −22° C. and have a microstructure which contained 41% 1,2-polybutadiene units, 29% 1,4-polybutadiene units and 30% random polystyrene units. The Mooney viscosities of the base and coupled 30/70 SBRs were 25 and 62, respectively.

While certain representative embodiments and details have been shown for the purpose of illustrating the subject invention, it will be apparent to those skilled in this art that various changes and modifications can be made therein without departing from the scope of the subject invention.

What is claimed is:

1. A styrene-isoprene-butadiene rubber which is particularly valuable for use in making tire treads, said rubber being comprised of repeat units which are derived from about 5 weight percent to about 40 weight percent styrene, from about 1 weight percent to about 10 weight percent isoprene, and from about 50 weight percent to about 94 weight percent 1,3-butadiene, wherein the repeat units derived from styrene, isoprene, and 1,3-butadiene are in essentially random order, wherein the rubber has a glass transition temperature which is within the range of about −20° C. to about −45° C., and wherein over 70% of the repeat units in the SIBR which are derived from styrene are in blocks of only one repeat unit, wherein the rubber is coupled with a member selected from the group consisting of tin tetrachloride and silicon tetrachloride, wherein the rubber has a Mooney viscosity which is within the range of about 70 to about 120, and wherein the rubber has a number average molecular weight which is within the range of about 250,000 to about 300,000.

2. A styrene-isoprene-butadiene rubber as specified in claim 1 which is particularly valuable for use in making tire treads, wherein the rubber has a weight average molecular weight of about 400,000 to about 800,000, and wherein the rubber has an inhomogeneity which is within the range of about 0.5 to about 1.5.

3. A styrene-isoprene-butadiene rubber as specified in claim 2 wherein the repeat units in the rubber are derived from about 20 weight percent to about 35 weight percent styrene, from about 2 weight percent to about 6 weight percent isoprene, and from about 59 weight percent to about 78 weight percent 1,3-butadiene.

4. A styrene-isoprene-butadiene rubber as specified in claim 3 wherein at least 90% of the repeat units in the rubber which are derived from styrene are in blocks of two or less repeat units.

5. A styrene-isoprene-butadiene rubber as specified in claim 4 wherein said rubber has an inhomogeneity which is within the range of about 0.8 to about 1.2.

6. A styrene-isoprene-butadiene rubber as specified in claim 5 wherein the repeat units in said rubber are derived from about 25 weight percent to about 30 weight percent styrene, from about 3 weight percent to about 5 weight percent isoprene and from about 65 weight percent to about 72 weight percent 1,3-butadiene.

7. A styrene-isoprene-butadiene rubber as specified in claim 6 wherein said rubber has a glass transition temperature which is within the range of about −25° C. to about −40° C.

8. A styrene-isoprene-butadiene rubber as specified in claim 1 wherein said rubber has a Mooney viscosity which is within the range of about 80 to about 115.

9. A styrene-isoprene-butadiene rubber as specified in claim 1 wherein said rubber has a Mooney viscosity which is within the range of 90 to 110.

10. A styrene-isoprene-butadiene rubber as specified in claim 1 wherein said rubber has a glass transition temperature which is within the range of about −30° C. to about −35° C.

11. A styrene-isoprene-butadiene rubber as specified in claim 1 wherein over 95 percent of the repeat units which are derived from styrene are in blocks containing less than 4 repeat units.

12. A styrene-isoprene-butadiene rubber as specified in claim 7 wherein over 97 percent of the repeat units which are derived from styrene are in blocks containing less than 5 repeat units.

13. A styrene-isoprene-butadiene rubber as specified in claim 10 wherein over 99 percent of the repeat units which are derived from styrene are in blocks containing less than 6 repeat units.

* * * * *